US009763540B2

(12) United States Patent
Sarvestani

(10) Patent No.: US 9,763,540 B2
(45) Date of Patent: Sep. 19, 2017

(54) SMART GRILL

(71) Applicant: Seyed Amin Ghorashi Sarvestani, Keppel Bay (SG)

(72) Inventor: Seyed Amin Ghorashi Sarvestani, Keppel Bay (SG)

( * ) Notice: Subject to any disclaimer, the term of this patent is extended or adjusted under 35 U.S.C. 154(b) by 544 days.

(21) Appl. No.: 14/247,310

(22) Filed: Apr. 8, 2014

(65) Prior Publication Data

US 2015/0282660 A1 Oct. 8, 2015

(51) Int. Cl.
*A47J 37/07* (2006.01)
*A47J 37/04* (2006.01)
*A47J 27/21* (2006.01)

(52) U.S. Cl.
CPC ..... *A47J 37/0786* (2013.01); *A47J 27/21083* (2013.01); *A47J 37/041* (2013.01); *A47J 37/0704* (2013.01); *A47J 37/079* (2013.01); *A47J 37/0713* (2013.01); *A47J 37/0745* (2013.01); *A47J 37/0754* (2013.01); *A47J 2037/0795* (2013.01)

(58) Field of Classification Search
CPC .... A47J 37/07; A47J 37/0745; A47J 37/0754; A47J 37/0704; A47J 37/0713; A47J 37/0786; A47J 37/041; A47J 13/073; A47J 2037/0795
See application file for complete search history.

(56) References Cited

U.S. PATENT DOCUMENTS

| 2010/0132692 | A1* | 6/2010 | Shaffer | A47J 37/0713 126/39 E |
| 2012/0073453 | A1* | 3/2012 | Choi | A47J 37/049 99/443 R |
| 2013/0139706 | A1* | 6/2013 | Robertson | A47J 37/042 99/419 |

OTHER PUBLICATIONS

Riches, D., "Can I use Charcoal in my Gas Grill?," May 2, 2016, bbq.about.com/od/grillsfaq.

* cited by examiner

*Primary Examiner* — Brian Jennison
(74) *Attorney, Agent, or Firm* — Emerson Thomson Bennett, LLC

(57) ABSTRACT

An outdoor charcoal grill may include a temperature sensor and a temperature adjustment device that is adjustable to control the heat applied to the food placed on a grate. A microprocessor may be programmable to set a food heating characteristic. The microprocessor may receive the temperature sensed by the temperature sensor and automatically adjust the temperature adjustment device to control the heat applied to the food.

1 Claim, 8 Drawing Sheets

SMART GRILL

I. BACKGROUND

A. Field of the Invention

This invention generally relates to food heating grills and more specifically to methods and apparatuses related to controlling an outdoor charcoal grill.

B. Description of Related Art

It is well known to heat food outdoors with a grill. There are several types of outdoor grills based on the fuel used to heat the food—including gas grills, electric grills and charcoal grills. Though all these outdoor grills are effective in heating food, heating food with charcoals is known to provide preferred cooking and/or taste benefits to many. A known problem with charcoal grills, however, is controlling the temperature that heats the food. Using known charcoal grills requires the griller to frequently check the food being heated to ensure that it is heating evenly and at the correct temperature. Typically, the food must be constantly turned over and/or moved to other parts of the grill to prevent burned or under heated food.

What is needed is an outdoor grill that provides the benefits of known charcoal grills but without the disadvantages.

II. SUMMARY

According to one embodiment of this invention, An outdoor charcoal grill may comprise: a support structure that is suitable to support the outdoor charcoal grill to an outdoor ground surface; a fire chamber that: (1) is suitable to hold associated burning charcoal; (2) is supportable to the support structure; and, (3) comprises first and second compartments; a grate that: (1) comprises a food reception surface that is suitable to support associated food to be heated; and, (2) is supportable to the support structure in a relative position with respect to the fire chamber so that the associated burning charcoal heats the associated food; a hood that selectively covers the fire chamber and the grate; a first temperature sensor that senses temperature within the first compartment of the fire chamber related to the associated food on the grate; a second temperature sensor that senses temperature within the second compartment of the fire chamber related to the associated food on the grate; first, second, third, fourth and fifth temperature adjustment devices that are each: (1) supported to the support structure; and, (2) adjustable to control the heat applied to the associated food; and, a microprocessor that: (1) is programmable to set at least one food heating characteristic; (2) receives the temperature sensed by the first and second temperature sensors; and, (3) based on the set food heating characteristic and the temperatures sensed by the first and second temperature sensors, automatically adjusts the first, second, third, fourth and fifth temperature adjustment devices to control, the heat applied to the associated food. The first temperature adjustment device may comprise: a first air fan that: (1) is supported to the support structure; and, (2) is operable to blow air over at least one of the fire chamber and the grate; wherein the microprocessor automatically operates the first air fan to control the heat applied to the associated food. The second temperature adjustment device may comprise: a height adjustment mechanism that is operatively connected to the fire chamber; wherein the microprocessor automatically operates the height adjustment device to adjust the height of the fire chamber to adjust the relative distance between the fire chamber and the grate to control heat applied to the associated food. The third temperature adjustment device may comprise: a first gas burner that: (1) is supported to the support structure; (2) is adjustable to supply heat to the associated food; wherein the microprocessor automatically operates the first gas burner to control heat applied to the associated food. The fourth temperature adjustment device may comprise: at least one exhaust fan that: (1) is supported to the hood; and, (2) is operable to exhaust air from within the hood; wherein the microprocessor automatically operates the at least one exhaust fan to control the heat applied to the associated food when the hood covers the fire chamber and the grate. The fifth temperature adjustment device may comprise: a grate turning mechanism that: (1) is operatively connected to the grate; and, (2) is operable to rotate the grate with respect to the fire chamber; wherein the microprocessor automatically operates the grate turning mechanism to control a relative angle of the grate with respect to the fire chamber to control the heat applied to the associated food.

According to another embodiment of this invention, An outdoor charcoal grill may comprise: a support structure that is suitable to support the outdoor charcoal grill to an outdoor ground surface; a fire chamber that: (1) is suitable to hold associated burning charcoal; and, (2) is supportable to the support structure; a grate that: (1) comprises a food reception surface that is suitable to support associated food to be heated; and, (2) is supportable to the support structure in a relative position with respect to the fire chamber so that the associated burning charcoal heats the associated food; a temperature sensor that senses temperature related to the associated food on the grate; a first temperature adjustment device that: (1) is supported to the support structure; and, (2) is adjustable to control the heat applied to the associated food; and, a microprocessor that: (1) is programmable to set at least one food heating characteristic; (2) receives the temperature sensed by the temperature sensor; and, (3) based on the set food heating characteristic and the temperature sensed by the temperature sensor, automatically adjusts the first temperature adjustment device to control the heat applied to the associated food.

One advantage of this invention, according to some embodiments of this invention, is that food temperatures can be easily controlled while being grilled by charcoal.

Another advantage of this invention, according to some embodiments of this invention, is that a grilling process can be fully automated.

Yet another advantage of this invention, according to some embodiments of tins invention, is that a microprocessor can be pre-programmed and/or set by the griller to achieve the desired grilling results.

Still another advantage of this invention, according to some embodiments of this invention, is that Other benefits and advantages of this invention will become apparent to those skilled in the art to which it pertains upon reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION

Figure 1:
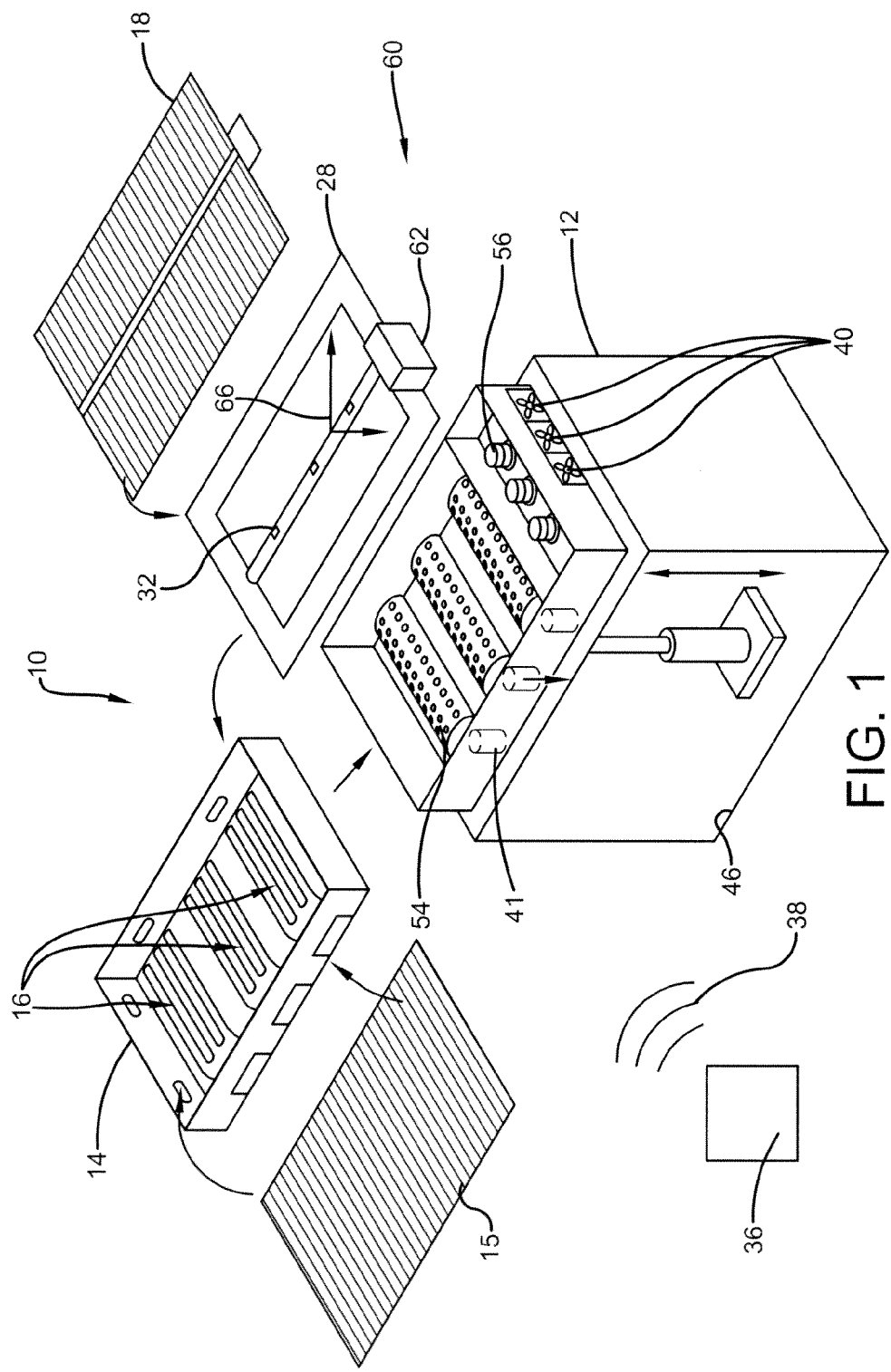
FIG. 1 is an assembly view of a smart grill according to some embodiments of this invention with the hood removed.
Figure 4:
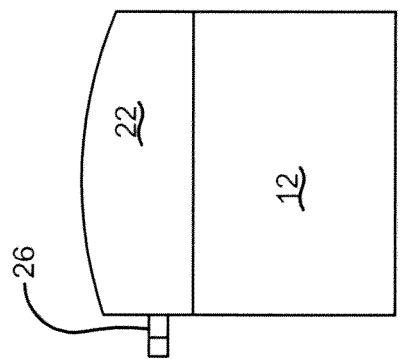
FIG. 4 is a left side view of the smart grill shown in FIG. 1 after the grill has been assembled and including the hood.

Referring now to the drawings wherein the showings are for purposes of illustrating embodiments of the invention only and not for purposes of limiting the same, and wherein like reference numerals are understood to refer to like components, FIG. 1 shows a an outdoor grill 10, termed a "smart grill", according to some embodiments of this invention. The grill 10 may include a support structure 12 of any type chosen with the sound judgment of a person of skill in the art that is suitable to support the grill 10 to an outdoor ground surface. The grill 10 may also include a fire chamber 14 that is suitable to hold burning charcoal (not shown but well known to those of skill in the art) on charcoal support surface 15 and that is supportable to the support structure 12. For reasons to be discussed below, the fire chamber 14 may have multiple areas or compartments 16. For the embodiment shown, the fire chamber 14 has three compartments 16 extending from side to side but any number of compartments 16, including just one compartment, and any orientation of compartments chosen with the sound judgment of a person of skill in the art may be used with this invention.

Figure 6:
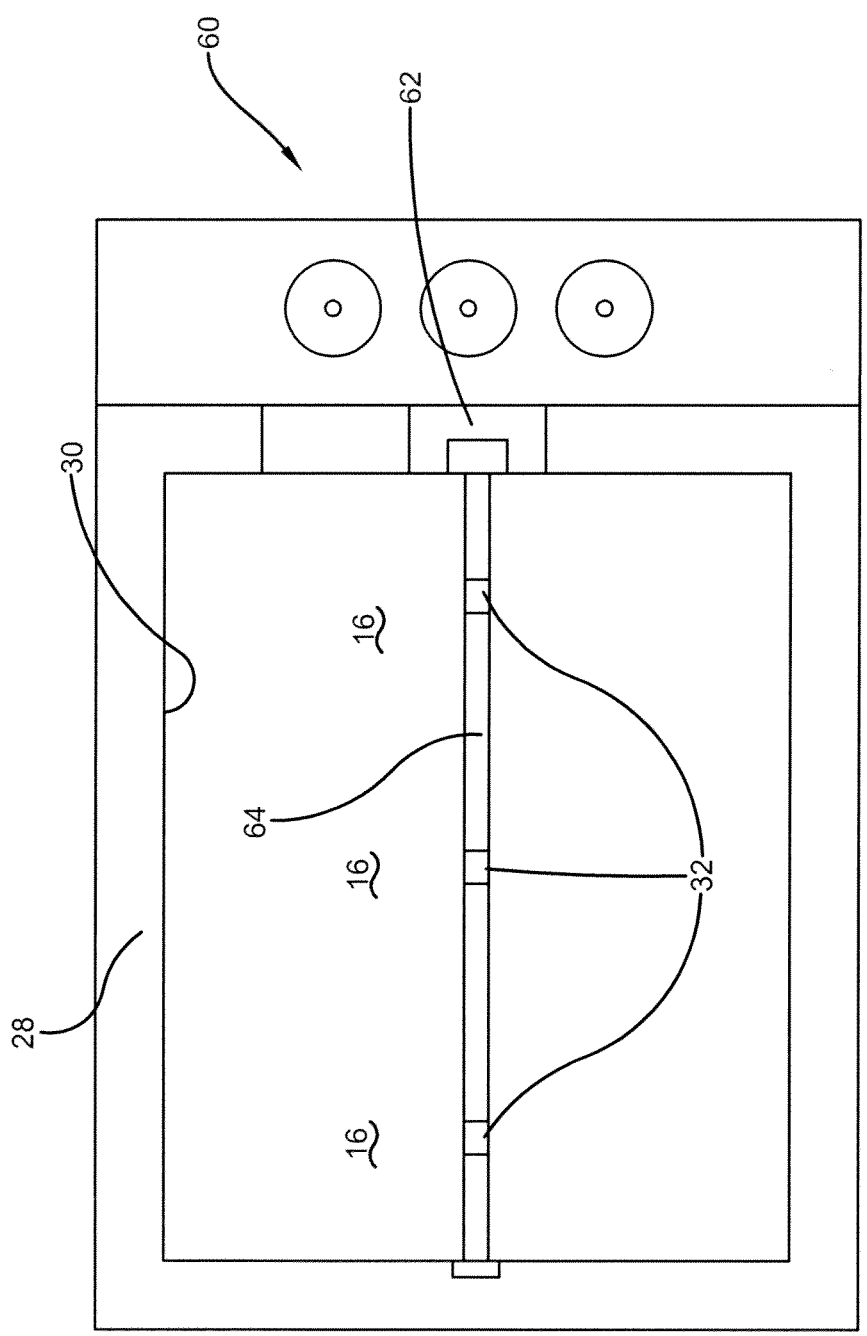
FIG. 6 is a top view if the grate support bracket showing temperature sensors and a grate turning mechanism according to some embodiments of this invention.
Figure 7:
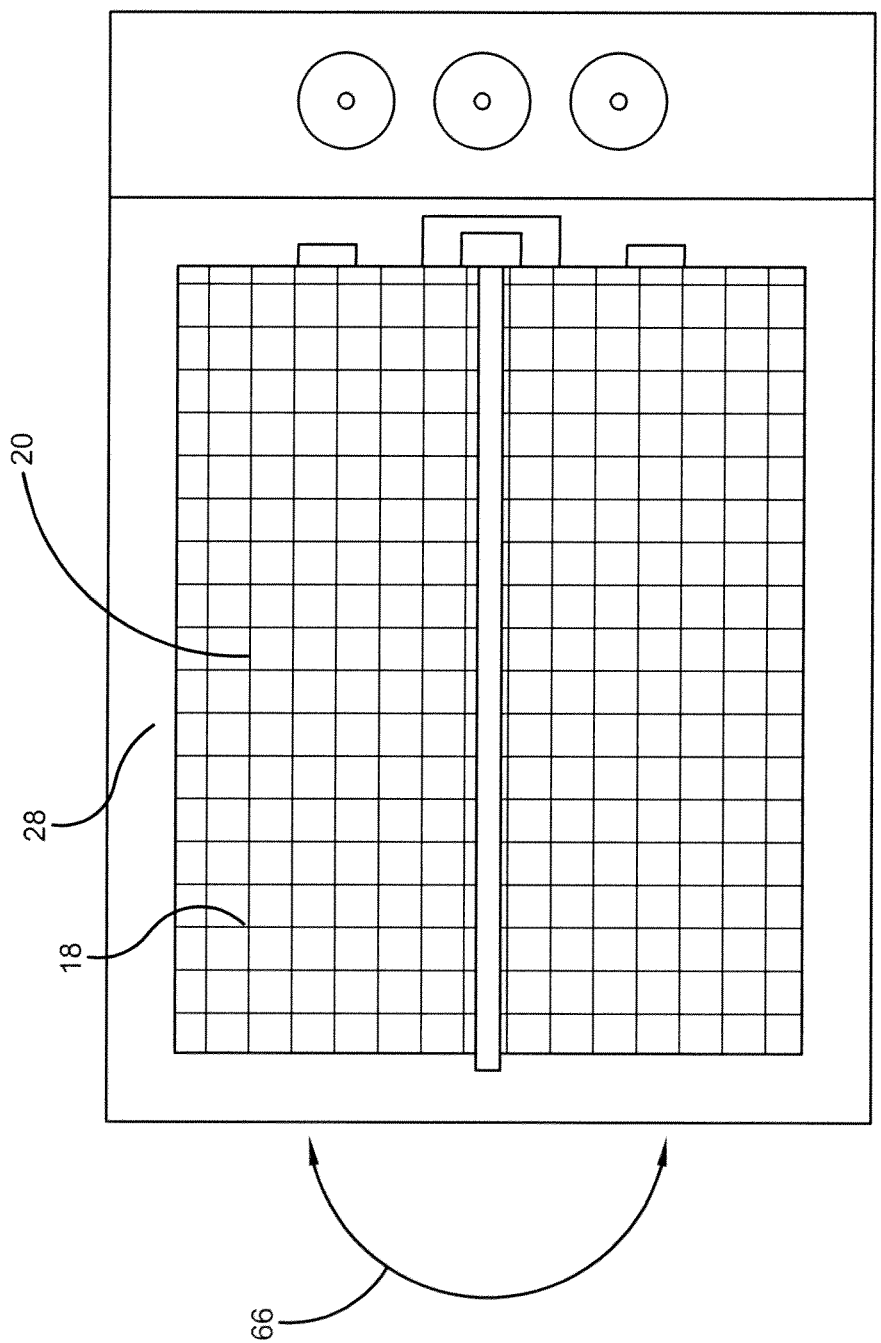
FIG. 7 is a top view of the grate on the grate support bracket. Surface 7 holds the charcoals on top of the air pipes.

With reference now to FIGS. 1 and 6-7, the grill 10 may include a grate 18 that has a food reception surface 20 that is suitable to support food to be heated. While the grate 18 shown may be generally planar with a rectangular shape, it should be understood that any grate chosen with the sound judgment of a person of skill in the art may be used with this invention. The grate 18 may be supportable to the support structure 12 in a relative position with respect to the fire chamber 14 so that the burning charcoal heats the food when food it positioned on the food reception surface 20. In one embodiment, shown, the grate 18 is received on a grate support bracket 28. The support bracket 28 may have an opening 30 to permit the heat to be easily transferred from the burning charcoal in the fire chamber 14 up to the grate 18 and thus up to the food resting on the food reception surface 20.

With reference now to FIGS. 2-5, the grill 10 may include a hood 22 that selectively covers the fire chamber 14 and the grate 18. The hood 22, in one embodiment, is pivotal about hinges 24 so that the hood 22 can be easily pivoted between open (where the grate 18 is accessible) and closed (where the hood 22 covers the grate 18) positions. A handle 26 may be provided on the hood 22 to make adjustment of the hood 22 easy for the griller. In some embodiments, a hood is not required. When a hood is used, it can be of any type and size chosen with the sound judgment of a person of skill in the art.

Figure 2:
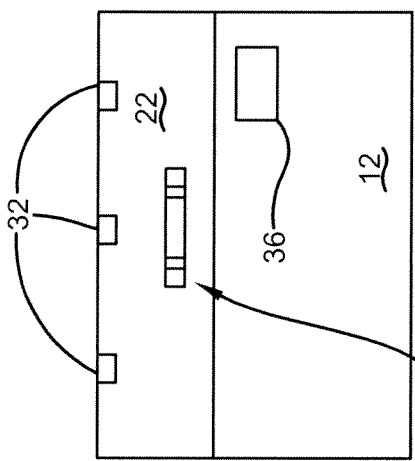
FIG. 2 is a front view of the smart grill shown in FIG. 1 after the grill has been assembled and including the hood.

With reference now to FIGS. 1, 2 and 6, at least one temperature sensor 32 may be positioned within the grill 10 so that accurate temperatures can be measured and communicated. The temperature sensors used with this invention can be of any type chosen with the sound judgment of a person of skill in the art suitable to reliably measure temperatures within a grill. For the embodiment shown, there is at least one temperature sensor 32 within each fire chamber compartment 16. In a more specific embodiment, there are at least two temperature sensors 32 within each compartment 16, one below the grate 18, supported for example to the grate support bracket 28 as shown, and one above the grate 18. The temperature sensors 32 above the grate 18 may be, for example, supported to the hood 22. By having at least one temperature sensor 32 within each compartment 16, the temperatures within each compartment can be easily determined. In another embodiment, two temperature sensors 32 positioned above the grate 18 and are sufficient to properly measure temperatures.

With reference now to FIGS. 1-2, at least one temperature adjustment device and a microprocessor 36 may be used with this invention. The temperature adjustment device may be supported to the support structure 12 and may be adjustable to control the heat applied to the food on the grate 18. Various embodiments of temperature adjustment devices will be described below. The microprocessor 36 may be programmable to set at least one food heating characteristic. This set may either be pre-programmed or manually set by the griller. Non-limiting examples of food heating characteristics include temperature and time of cooking. The microprocessor 36 may receive the temperature sensed by the temperature sensor(s) 32. Then, using the food heating characteristic(s) set (that is, programmed) by the griller and the temperatures sensed by the temperature sensor(s) 32, the microprocessor 36 may then automatically adjust the temperature adjustment device(s) to control the heat applied to the food on the grate 18. The microprocessor 36 can be of any type and style chosen with the sound judgment of a person of skill in the art. In one embodiment, the microprocessor 36 is supported to the support structure 12, such as shown schematically in FIG. 2. In another embodiment, the microprocessor 36 resides within a computer such as a tablet or smart phone, such as shown schematically in FIG. 1. In yet another embodiment, the microprocessor may be contained in part on the support structure 12 and in part in the separate computer. The microprocessor 36 may have a touch screen panel whereby the griller can input the food heating characteristic(s). The microprocessor 36 may receive and send control signals 38 via wires or wirelessly. As the operation of a microprocessor 36 is well known to those of skill in the art, further details will not be provided here.

Figure 9:
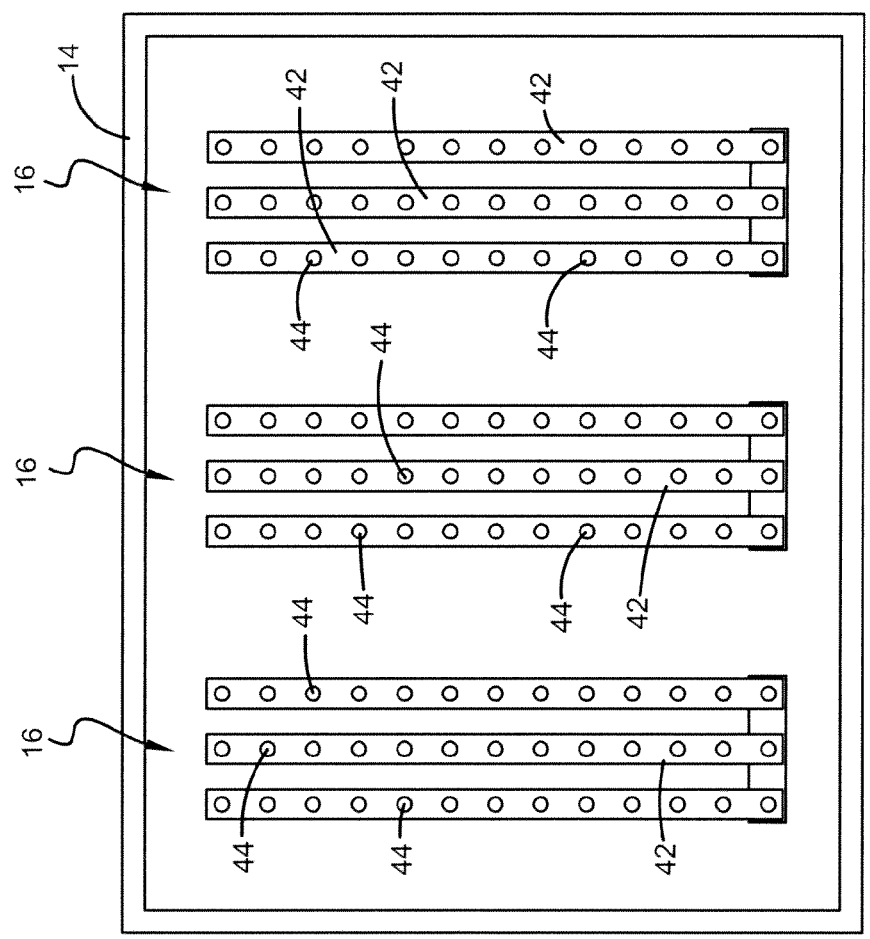
FIG. 9 is a top view showing the pipes used with the air fans.
Figure 10:
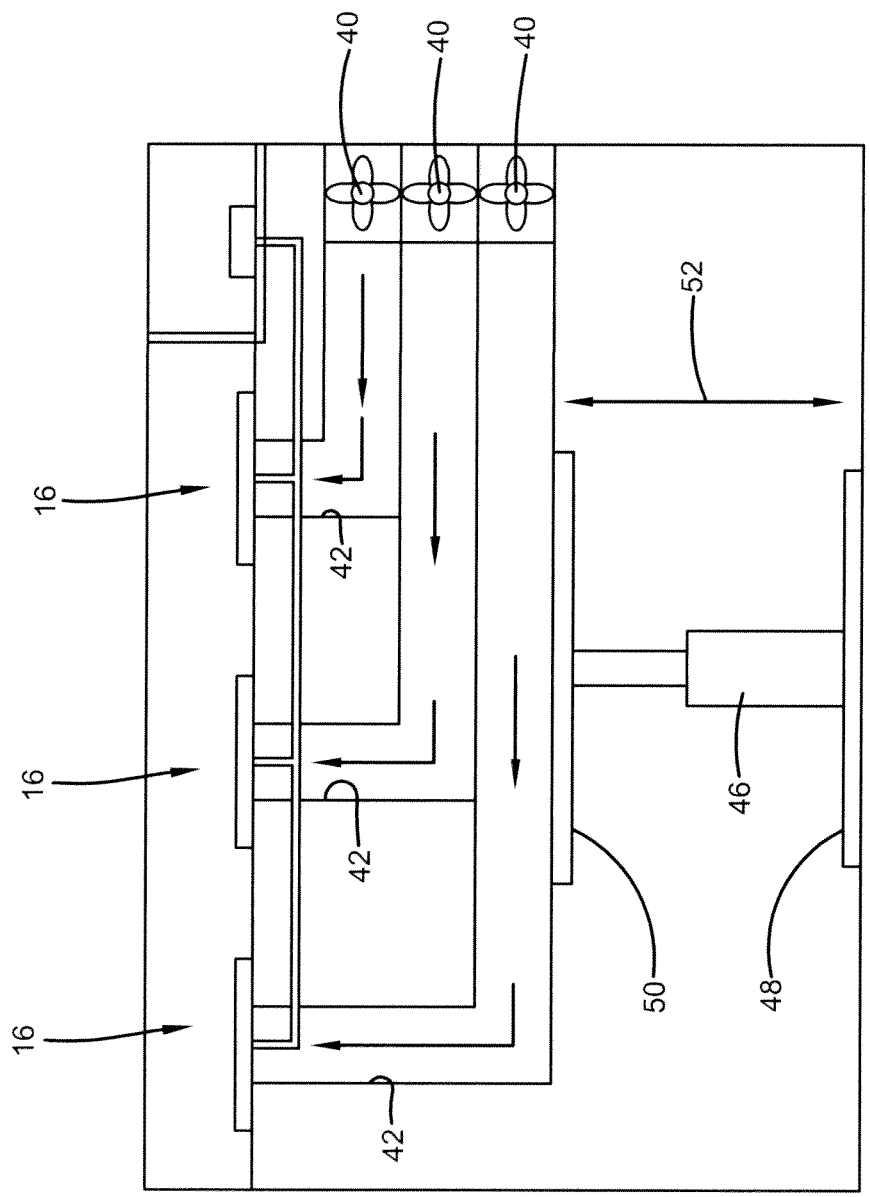
FIG. 10 is a side sectional view showing the air fans and the height adjustment mechanism.

With reference now to FIGS. 1 and 9-10, in one embodiment, the temperature adjustment device may include at least one air fan or blower 40 that is supported to the support structure 12 and is operable to blow air over the fire chamber 14 and/or the grate 28. In one embodiment, shown, a separate air fan 40 is used for each fire chamber compartment 16. To reach the compartments 16, each air fan 40 may communicate with (and blow air through) airflow channels 41 and pipes 42 that extend into the compartments 16. This air flow is illustrated with arrows within the pipes 42 in FIG. 10. The pipes 42 may have holes 44 positioned as desired within the compartments 16 to direct the blow air accordingly. For the embodiment shown, each air fan 40 blows air through a main pipe that branches into three pipes that extend into each compartment 16. The air fans 40 may be electric powered, in one embodiment. The microprocessor 36 may automatically operate one or more of the air fans 40 to control the heat applied to the food. In one embodiment, the heat may be controlled in each compartment 16 individually. In another embodiment, the one or more of the air fans 40 may also be manually operable.

Figure 11:
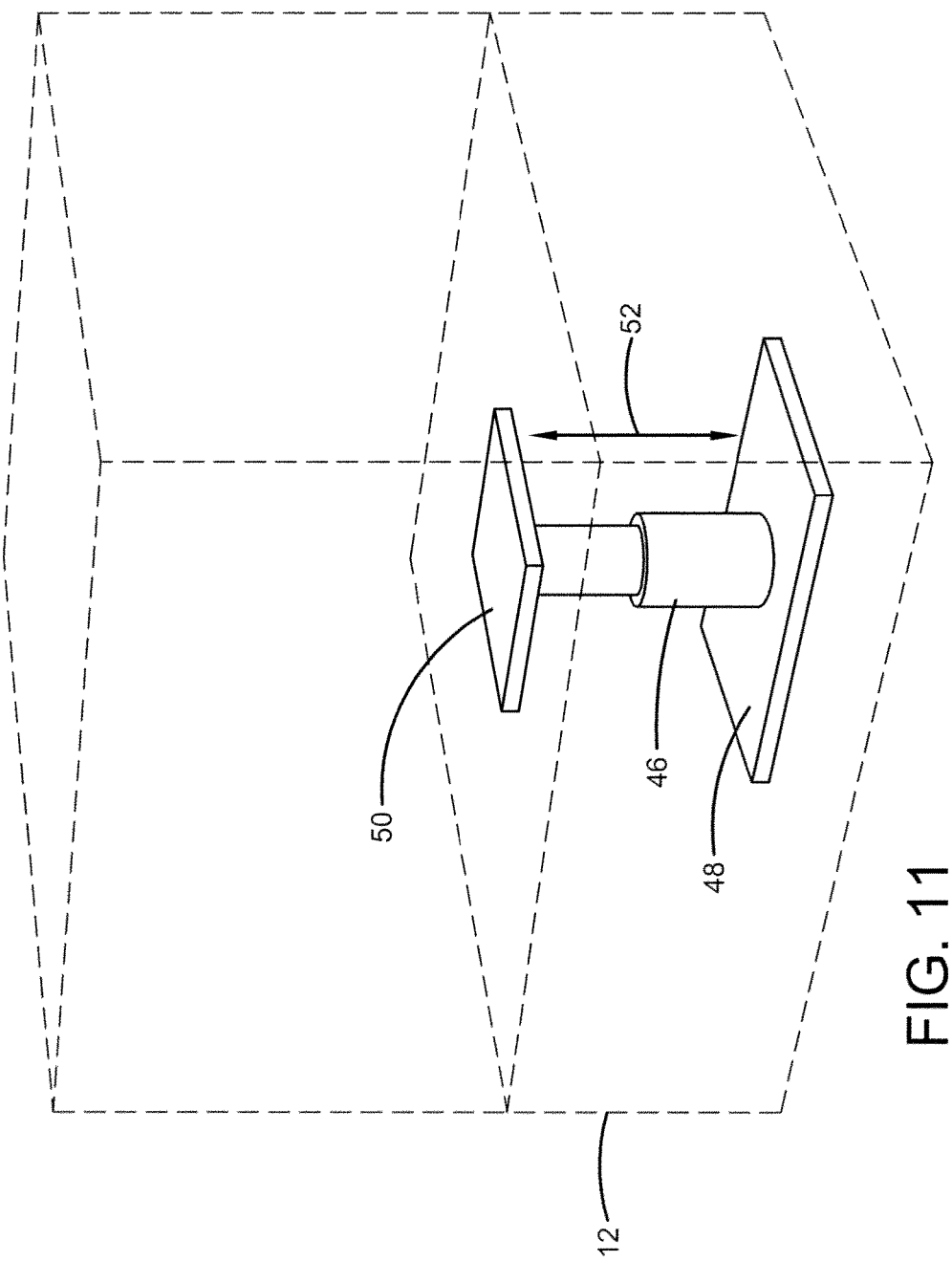
FIG. 11 is a side perspective view showing schematically the height adjustment mechanism.

With reference now to FIGS. 1 and 10-11, in another embodiment, the temperature adjustment device may include a height adjustment mechanism 46 that is operatively connected to the fire chamber 14. The height adjustment mechanism 46 may have a base 48 supported to a bottom portion of the support structure 12 and a fire chamber contact plate 50 that contacts a bottom surface of the fire chamber 14. The height adjustment mechanism 46 may be operated to raise and lower the fire chamber contact plate 50 with respect to the base 48 over a distance range 52. In this way the height adjustment mechanism 46 may be operated, automatically by the microprocessor 36, to adjust the height of the fire chamber 14 to adjust the relative distance between the fire chamber 14 and the grate 18 to control heat applied to the food. The height adjustment mechanism 46 may be powered in any manner chosen with the sound judgment of a person of skill in the art including but not limited to electrically, hydraulically and, pneumatically. In one embodiment, the heat may be controlled in each compartment 16 individually. In yet another embodiment, the height adjustment mechanism 46 may also be manually operable.

Figure 8:
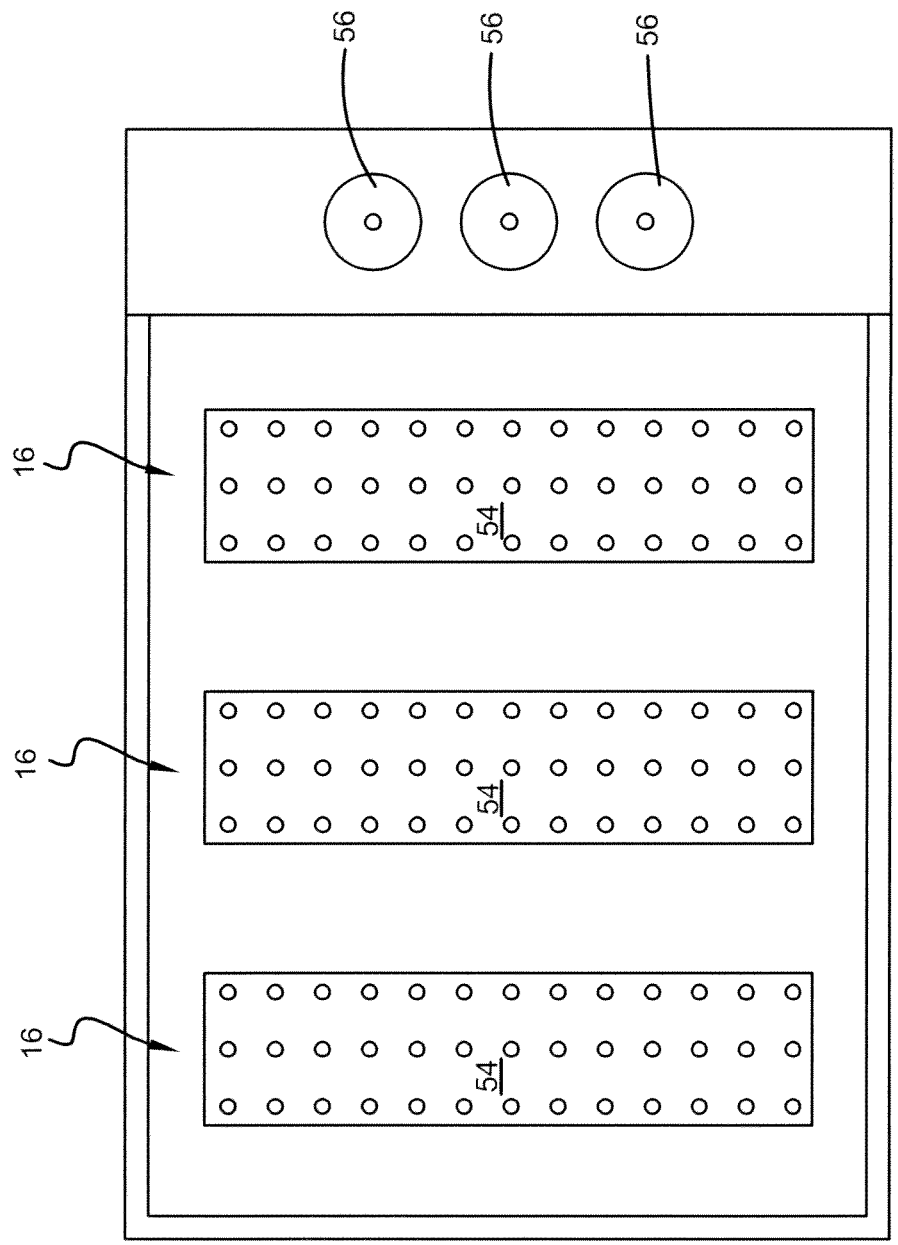
FIG. 8 is a top view showing the gas burners and the gas flow valves.

With reference now to FIGS. 1 and 8, in another embodiment, the temperature adjustment device may include at least one gas burner 54 that is supported to the support structure 12 and is adjustable to supply heat to the food. This heat may be desirable, for example, when the charcoal is unable to provide sufficient heat. In one embodiment, shown, a separate gas burner 54 is used for each fire chamber compartment 16. Each gas burner 54 may be adjusted with a gas flow valve 56. The gas burner(s) 56 in one embodiment, shown, may be positioned below the fire chamber 14. The microprocessor 36 may automatically operate the gas burners) 56 to control heat applied to the food. In one embodiment, the heat may be controlled in each compartment 16 individually. In another embodiment, the gas burner(s) 56 may also be manually operable. The gas burner(s) 56 may also be used to ignite the charcoal initially. This saves the griller from having to use matches and/or starter fluid. In yet another embodiment, the gas burner(s) 56 may also be used when there is no charcoal available.

Figure 5:
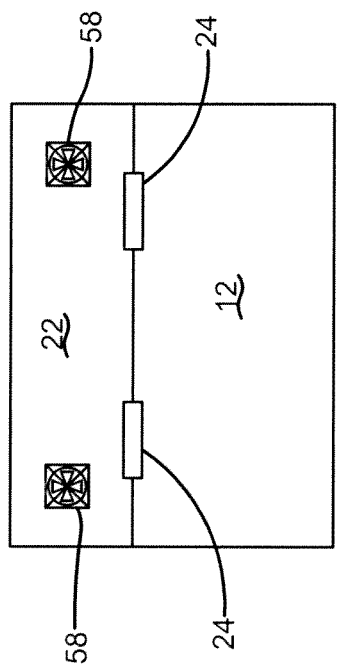
FIG. 5 is a rear view of the smart grill shown in FIG. 1 after the grill has been assembled and including the hood.
Figure 3:
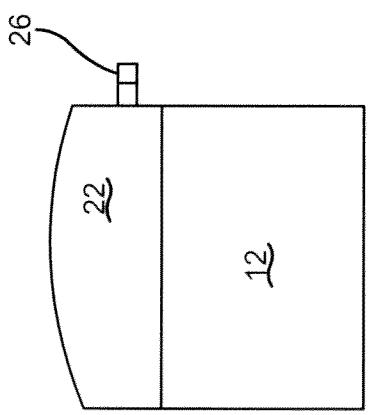
FIG. 3 is a right side view of the smart grill shown in FIG. 1 after the grill has been assembled and including the hood.

With reference now to FIG. 5, in another embodiment, the temperature adjustment device may include at least one exhaust fan 58 that is supported to the hood 22 and is operable to exhaust air from within the hood 22. In one embodiment, shown, two exhaust fans 58 are used. In another embodiment, one exhaust fan 58 is provided for each compartment 16, permitting heat control in each compartment 16 individually. The exhaust fans 58 may be electric powered, in one embodiment. The microprocessor 36 may automatically operate one or more of the exhaust fans 58 to control the heat applied to the food when the hood 22 covers the fire chamber 14 and the grate 18. In another embodiment, the one or more of the exhaust fans 58 may also be manually operable.

With reference now to FIGS. 1 and 7, in another embodiment, the temperature adjustment device may include a grate turning mechanism 60 that is operatively connected to the grate 18 and operable to rotate the grate 18 with respect to the fire chamber 14. For the embodiment shown, the grate turning mechanism 60 includes a motor 62 and a shall 64 operatively attached to the grate support bracket 28. Because the grate 18 is supported to the grate support bracket 28, movement of the grate support bracket 28 will also move the grate 18 and thus the food resting on the grate 18. When the motor 62 is operated, the grate support bracket 28, and thus the grate 18 and food resting on the grate 18, rotates through angle 66. The microprocessor 36 may automatically operate the grate turning mechanism 60 to control a relative angle of the grate 18 with respect to the fire chamber 14 to control the heat applied to the food. In one embodiment, the grate 18 may be adjusted over a range of between zero degrees to about 180 degrees, thus angle 66 may be between 0 and 180 degrees. The motor 62 may be an electric motor in one embodiment. In another embodiment, the grate turning mechanism 60 may also be manually operable.

With reference now to all the FIGURES, the operation of the smart grill 10 will now be described according to some embodiments. Other operations will be apparent to persons of skill in the art. The griller may place charcoal into the fire chamber 14 and ignite the charcoal. The charcoal may be ignited manually, such as with a match, or by operating the gas burner(s) 54, manually or automatically with the microprocessor 36. The griller may program the microprocessor 36 to set at least one food desired heating characteristic. The griller may then place the food to be heated onto the food reception surface 20 of the grate 18. If the grill 10 includes a hood 22, the griller may then close the hood 22 over the food, grate 18 and fire chamber 14. Depending on the temperature adjustment device(s) that come with the grill 10 and further depending on the griller s particular use requirements, the temperature adjustment device(s) may be placed into initial conditions. The height adjustment mechanism 46, for example, may be adjusted to the desired height. As another example, the grate turning mechanism 60 may be adjusted to the desired angle 60.

With continue reference to all the FIGURES, the temperature adjustment device(s) may then operate automatically to heat the food as programmed into the microprocessor 36. If, for example, the temperature sensor 32 in one compartment 16 indicates that the temperature in that compartment 16 is too low, the microprocessor 36 may automatically adjust the gas flow valve 56 associated with the corresponding gas burner 54 to increase the gas flow to increase the temperature in that compartment 16. As another example, if the temperature sensors 32 in each compartment 16 indicate that the temperature is too low, the microprocessor 36 may: (1) automatically adjust all the gas flow valves 56 associated with the corresponding gas burners 54 to increase the gas flow to increase the temperature throughout; and/or, (2) automatically adjust height adjustment mechanism 46 to raise the lire chamber 14 closer to the grate 18 and thus closer to the food; and/or (3) automatically adjust the air fans 40 to provide additional air/oxygen to the charcoal to raise the temperature provided by the charcoal.

Still referring to ail the FIGURES, as yet another example, if the temperature sensors 32 in each compartment 16 indicate that the temperature is too high, the microprocessor 36 may: (1) automatically adjust all the gas flow valves 56 associated with the corresponding gas burners 54 to decrease the gas flow to lower the temperature throughout; and/or, (2) automatically adjust height adjustment mechanism 46 to lower the fire chamber 14 away from the grate 18 and thus farther from to the food; and/or (3) automatically adjust the exhaust fans 58 to remove heated air from the grill 10 to reduce the temperature within the grill 10. The grate turning mechanism 60 may also be automatically operated to adjust the angle 66 to ensure that the food on the grate 18 is properly heated on both sides.

Numerous embodiments have been described herein. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof. Thus, for example, the order of actions described above when using the smart grill 10 may be altered. Further, the "invention" as that term is used in this document is what is claimed in the claims of this document. The right to claim elements and/or sub-combinations that are disclosed herein as other inventions in other patent documents is hereby unconditionally reserved.

Having thus described the invention, it is now claimed:

1. A charcoal grill comprising:
   a support structure;
   a grate that,
      has a food reception surface suitable to support associated food to be heated, and
      is engaged to the support structure;
   a fire chamber that,
      has a charcoal support surface suitable to hold associated burning charcoal positioned to heat the grate,
      is movably engaged with the support structure,
      has a first compartment,
      has a second compartment,
      wherein heat may be controlled in each compartment individually;
   a hood adapted to be selectably movable between
      a closed position in which it covers the grate, and
      an open position in which the grate is accessible;
   a first temperature sensor adapted to measure temperature of the first compartment of the fire chamber;
   a second temperature sensor adapted to measure temperature of the second compartment of the fire chamber;
   a microprocessor that,
      is programmable to set at least one food heating characteristic;
      receives the temperature sensed by the first and second temperature sensors; and,
      is adapted to adjust one or more temperature adjustment devices to control the heat applied to the associated food based upon
         the set food heating characteristic, and
         the temperatures sensed by the first and second temperature sensors;
   a first temperature adjustment device having a first fan adapted to blow air into the first compartment to provide additional air to the charcoal therein to raise the temperature provided by the charcoal therein to control the heat applied to the associated food;
   a second temperature adjustment device having a second fan adapted to blow air into the second compartment to provide additional air to the charcoal therein to raise the temperature provided by the charcoal therein to control the heat applied to the associated food;
   a third temperature adjustment device having a height adjustment mechanism adapted to raise or lower the fire chamber with respect to the support structure to control the heat applied to the associated food;
   a fourth temperature adjustment device having at least one exhaust fan
      adapted to exhaust air from within the hood, and
      adapted to control the heat applied to the associated food when the hood is closed; and
   a fifth temperature adjustment device having a grate turning mechanism adapted to rotate the grate with respect to the fire chamber.

* * * * *